Sept. 11, 1928.  W. E. HOLLAND  1,684,276
MEANS FOR REPLENISHING ELECTROLYTIC CELLS
Filed July 23, 1920   2 Sheets-Sheet 1
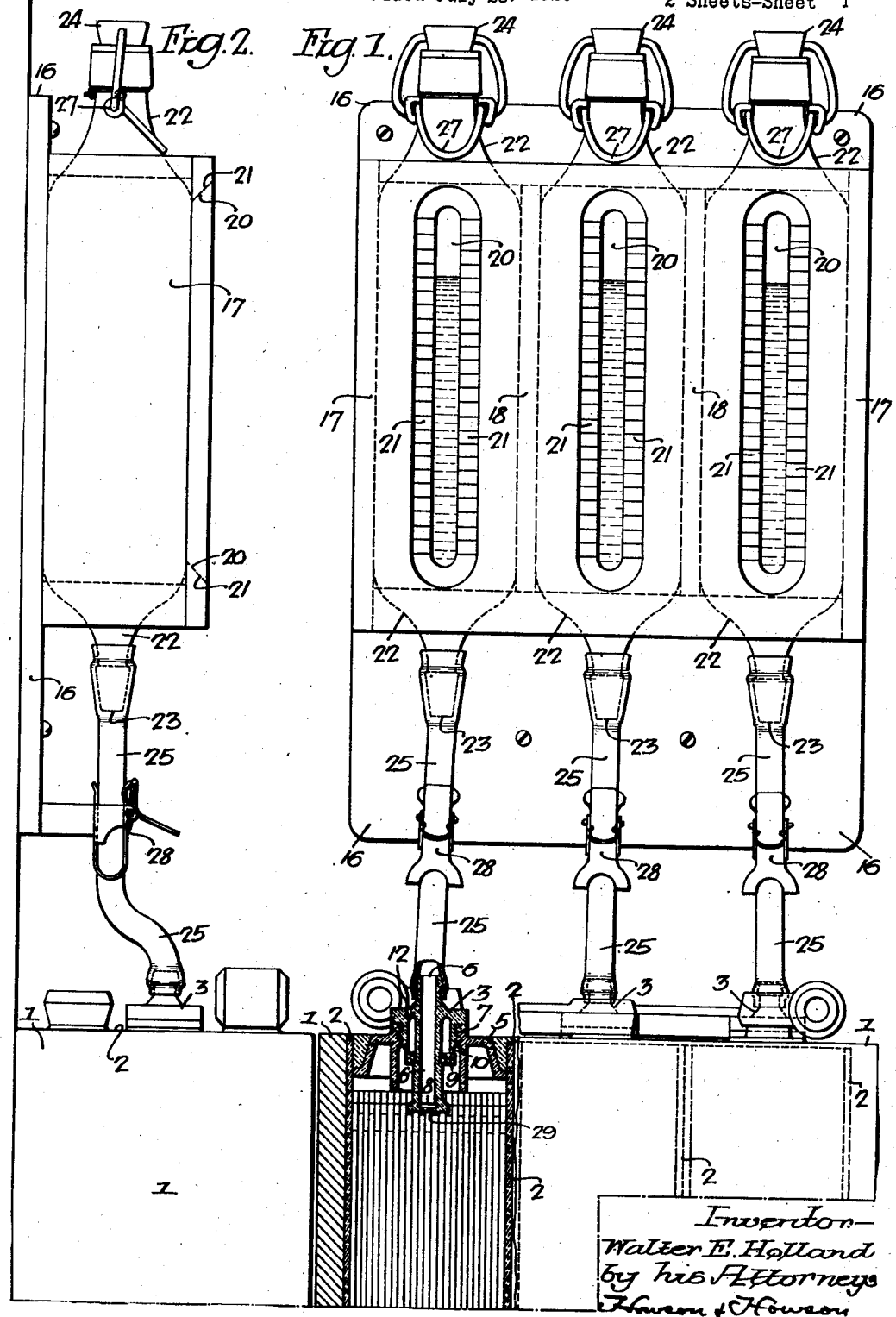

Sept. 11, 1928.  
W. E. HOLLAND  
MEANS FOR REPLENISHING ELECTROLYTIC CELLS  
Filed July 23, 1920    2 Sheets-Sheet 2

1,684,276

Inventor—
Walter E. Holland
by his Attorneys
Howson & Howson

Patented Sept. 11, 1928.

1,684,276

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

MEANS FOR REPLENISHING ELECTROLYTIC CELLS.

Application filed July 23, 1920. Serial No. 398,457.

One object of this invention is to provide a relatively simple, inexpensive, easily applied, substantial device for automatically maintaining the liquid in an electrolytic cell at a predetermined level; the invention especially contemplating a novel form of barometric feeding apparatus for automatically replenishing the water lost from the cells of a storage battery by decomposition and evaporation.

The invention further contemplates a device of the above character which shall make possible a comparison of the quantities of water required by each of a number of cells operating together as a battery, and shall therefore give an indication of the condition of the cells; the arrangement being such that the amount of liquid which has been delivered to each cell may be readily observed.

Another object of the invention is to provide an automatic water replenishing device for electrolytic cells which shall be of such a nature as to require attention only at long intervals, which will operate successfully whether at rest or in vibration, as on a motor car, and whose construction and arrangement of parts shall be such that it will not be injured by exposure to temperatures below the freezing point, nor ordinarily be prevented from operation by the freezing of a portion of the water which it contains.

I also desire to provide a device of the class described which may be quickly and conveniently refilled and which may be applied to storage batteries as at present manufactured without requiring material change thereof; with the resultant benefit to the storage battery due to the solution being kept always at the correct level.

Figure 3:
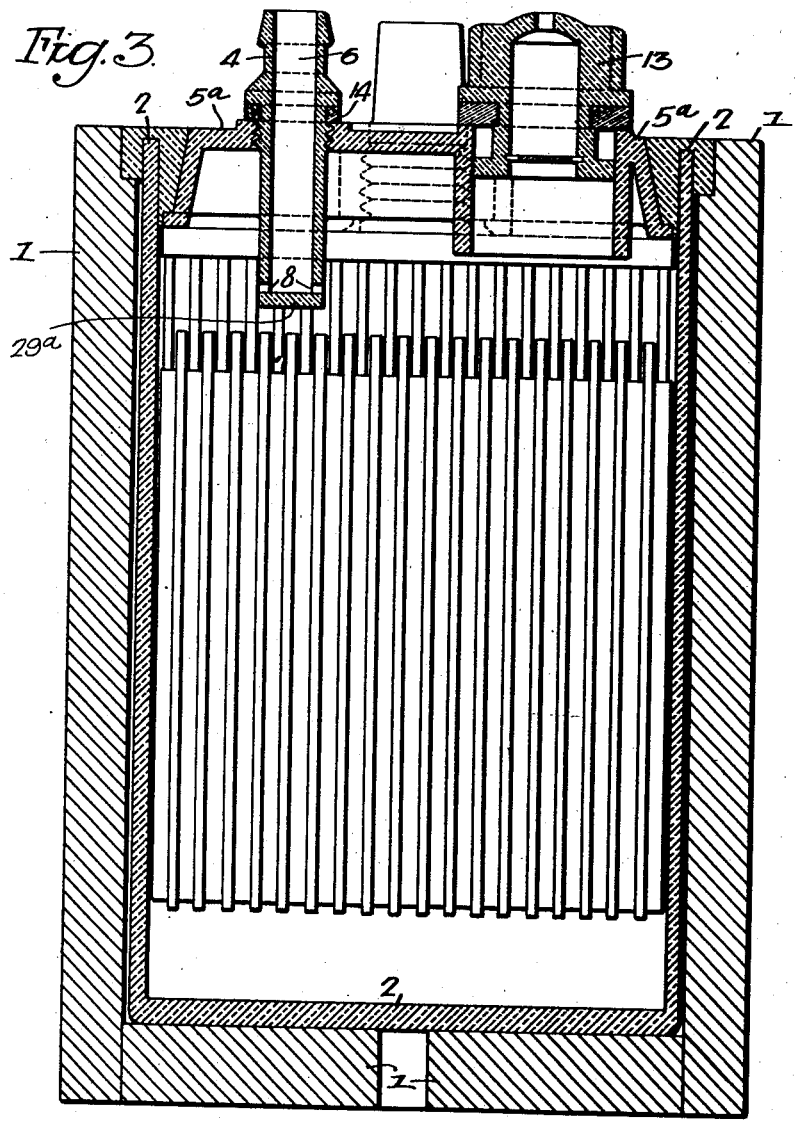
Figure 4:
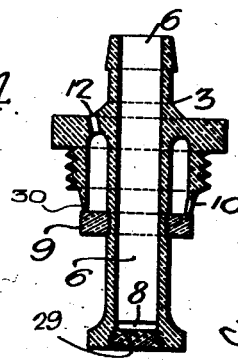

These objects and other advantageous ends I attain as hereinafter set forth, reference being had to the accompanying drawings, in which, Figs. 1 and 2 are respectively a front elevation, partly in vertical section, and a side elevation, showing my invention as applied to a storage battery;

Fig. 3 is a vertical section of a storage battery cell having a special cover employing a filling tube and a separate vent cap; and Fig. 4 is a longitudinal vertical section of a combined filling tube and vent cap which may be employed as part of my invention.

In the above drawings 1 represents the wooden tray or case for a series of battery cells 2, each of which in accordance with my invention is equipped either with a combined vent cap and filling tube 3 of the construction shown in Figs. 1 and 4, or with an independent filling tube 4, as shown in Fig. 3.

In the construction shown in Fig. 4, the combined vent cap and filling tube consists of a flanged cap threaded to screw into the hard rubber or other cover 5 of a battery cell and having extending centrally through it a vertical conduit 6 whose upper end is tapered and externally flanged to provide a short rib or beading formed to fit into and make a secure and tight joint with a soft rubber tube. Said conduit 6 is extended below the threaded cap for such a distance that when the latter is properly screwed into the cover 5 so as to cooperate with the gasket 7, to make a liquid and gas tight connection therewith, its lower end is slightly below the level at which it is desired to maintain the liquid in the cell. The lower end of the conduit 6 is formed with one or more lateral openings 8 and terminates below these in a closed cap forming a baffle 29 to prevent the direct entrance into the conduit of gases given off by the plates, which would displace water in the bottle and cause it to enter the cell, whether needed or not, regardless of the height of solution in the cell. In some cases it may be advisable to have the capped end 29 of the conduit greater in diameter than the conduit itself, as shown in Figs. 1 and 4, to more certainly shield the lateral openings 8 from ingress of gases except when the solution level has fallen below said openings.

It is advantageous to have the outlet slot or slots 8 as small as possible in order that liquid in the end of the filling tube 6 will not be shaken out and air or gas admitted owing to vibration, as when used on an automobile, and resultant agitation of the liquid above the battery plates and in the tube. I have discovered that this slot or outlet may be made much smaller in practice than would be expected to be workable from theory, whether the apparatus is subjected to vibration or remains at rest, due probably to the liquid at the outlet being drawn down by the receding liquid around the tube owing to surface tension or other attractive force. In a battery replenishing apparatus for use on an automobile, for instance, I have found outlet slots from 1/16" to 1/8" wide and from 1/4" to 3/8" long to be preferable, the operation being certain under all conditions of use, although water will not flow or drop from such slots if tested independently of a battery cell with air surrounding the outlet.

The conduit 6, at or slightly below the level of the lower edge or lip 30 of the threaded cap 3, is preferably formed with an annular recess for the reception of a second baffle in the form of a ring 9 of such material as rubber which when placed in said recess lies in engagement with the lip 30 of said cap. The latter immediately above the ring 9 has a notch or opening 10 into the annular chamber formed between the cap body and the conduit 6, and a vent passage 12 leads from the top of this chamber to the atmosphere.

In the case of a battery cell constructed as shown in Fig. 3, I provide a vent cap 13 of usual or any desired construction and an independent filling tube 4 threaded into the cell cover 5ª and of such a length that the lateral openings 8 at its capped lower end are at the level at which it is desired to maintain the liquid in the cell. A packing ring 14 is confined between the top face of the cell cover and the flange on the filling tube 4 so as to make a gas and liquid tight joint therewith and the upper end of the tube is extended and given a frusto-conical form so as to adapt it to make connection with one end of a soft rubber tube.

Above the battery to which it is desired to apply my invention, I mount a bottle holder having a back member 16 in the form of a wood, metal or other plate of suitable size and having on this a suitable supporting structure 17, divided by partitions 18 into vertical compartments. The bottom of each of said compartments is perforated and the front of each of them has formed in it a vertical slot 20 whose sides 21 are bevelled and preferably graduated.

Within each compartment of the box 17 is a liquid container in the form of an elongated bottle or tank 22 having a bottom outlet or nozzle 23 and a top mouth normally closed by a gas tight seal 24. Each of the outlet nozzles 23 has connected to it a soft rubber tube 25 whose lower end is fitted to the upper end of the conduit 6 of the filling tube 4 or to a combined vent cap and filling tube 3. The stopper or seal 24 of each of the bottles or containers 22 is removably held in place by a spring clamp 27, and pinch cocks or stops 28 are respectively applied to the soft rubber connecting tubes 25 to be shut off to prevent flooding of the battery cells when the top stoppers are opened to fill the bottles. Said pinch cocks are preferably fixed to the supporting frame or plate 16 so as to steady and assist in supporting the rubber tubes 25.

With the above described apparatus in use, the pinch cocks 28 are closed to prevent flow through the tubes 25; the bottles 22 are then filled with water through their respective mouths and the stoppers 24 are then caused to close and seal said mouths, by proper manipulation of the spring clamps 27. If now the pinch cocks 28 be opened, water will pass from the bottles through the filling tubes into the several battery cells, in each of which the solution level will rise until the outlet openings 8 of said filling tubes are immersed and closed to access of air or gas whereupon further flow is stopped.

At any time independently of this flow of liquid, any excess air or gas may escape freely from the cells through the openings 10 and 12 of the vent cap and since these are positioned so that the conduit tube is interposed and serves as a baffle between them, and also owing to the use of the baffle 9, there is no possibility of the solution splashing or spraying out. From time to time as the solution in the cells evaporates or is decomposed, it is replenished automatically from the container or bottles 22 associated with the cells so that the level of liquid is kept at all times substantially constant, inflow of liquid being automatically checked as soon as it rises sufficiently to close the inlet openings 8. When the liquid level of any cell falls sufficiently to again uncover said opening, water is supplied as before, since the uncovering of the opening allows battery gases or air to enter the rubber tube 25 and thence rise into and displace water in the bottle 22.

It will be readily understood that by maintaining the solution of a battery at the correct level at all times, by the use of this invention, the battery will be protected from internal injury such as often results from the solution level falling below the tops of the plates and separators. Likewise, by preventing overfilling of the cells, spraying and slopping of the acid, or other electrolyte, is eliminated and the battery case with its associated and surrounding parts is protected from being harmed by the electrolyte.

At any time the condition of the various cells may be readily ascertained by observation of the levels of the liquid in the several bottles as visible through the slots 20, and any abnormal condition of a cell is at once indicated by a material variation in the height of the liquid in the bottle associated with it. If all of the cells of a battery used for a given purpose are operating normally and are in good condition, they will each require substantially the same amount of water in a given time to replenish that lost by operation. If however any cell requires an abnormal amount of water or on the other hand takes less water than is required by the others, as shown by a marked difference in water levels of the bottles, it will be understood that this is a positive indication of trouble of some sort and the cell or cells may be immediately inspected and given the required attention before the trouble has developed so far as to cause irreparable injury.

It is also to be noted that the above device is not injured by exposure to temperatures below the freezing point of water, since any ice formation commences at the highest point of the water within the bottles and is free to expand downward so that the result is simply that a slight surplus of liquid is forced into the cells connected thereto, and the solution level in the cells will become somewhat high temporarily. Since heat is generated by the battery under conditions of use, however, a greater or less amount of the water in the tubes 25 and the bottles 22 ordinarily is maintained in the liquid condition.

While I have shown and described my invention as applied to storage batteries, it has equal advantages, and may be used without departing from my invention, in connection with other classes of electrolytic cells which require more or less frequent replenishment of water or solution lost during operation.

I claim:—

1. The combination of an electrolytic cell; and a barometric device for maintaining a substantially constant liquid level therein, including a filling tube having an outlet smaller than will allow passage of the filling liquid when said tube is connected as for use but without external liquid adjacent said outlet.

2. The combination of an electrolytic cell; a liquid container mounted higher than said cell; a flexible conduit connecting said container and the cell; with a flow controlling device operative on said flexible conduit and supported so as to steady said conduit.

3. The combination of an electrolytic cell; a liquid container mounted higher than said cell; a supporting structure for said container; a flexible conduit connecting said container with the cell; and a pinch cock carried by said supporting structure for controlling the flow of liquid through the conduit.

4. The combination of an electrolytic cell having a vented cover; a single tube mounted therein and formed with a lateral filling opening substantially at the normal liquid level of the said cell, said opening being smaller than will allow the passage of the filling liquid when said tube is connected as for use but without external liquid adjacent said opening; with a barometric liquid feeding device connected to said tube.

5. The combination with an electrolytic cell, of a barometric device for maintaining a substantially constant liquid level therein, said device comprising a container located above the cell and a tube having its extremity covered and provided with at least one lateral opening into the cell smaller than will allow the passage of the filling liquid when said tube is connected as for use but without external liquid adjacent said opening and constituting a passage for the liquid from the container to the cell and of gas from the cell to the container.

WALTER E. HOLLAND.